March 10, 1931.  R. H. CUNNINGHAM  1,795,363
METHOD OF ASSEMBLING ELECTRICAL DEVICES AND
COVER PLATES WITH MULTIPLE JUNCTION BOXES
Filed Feb. 14, 1928
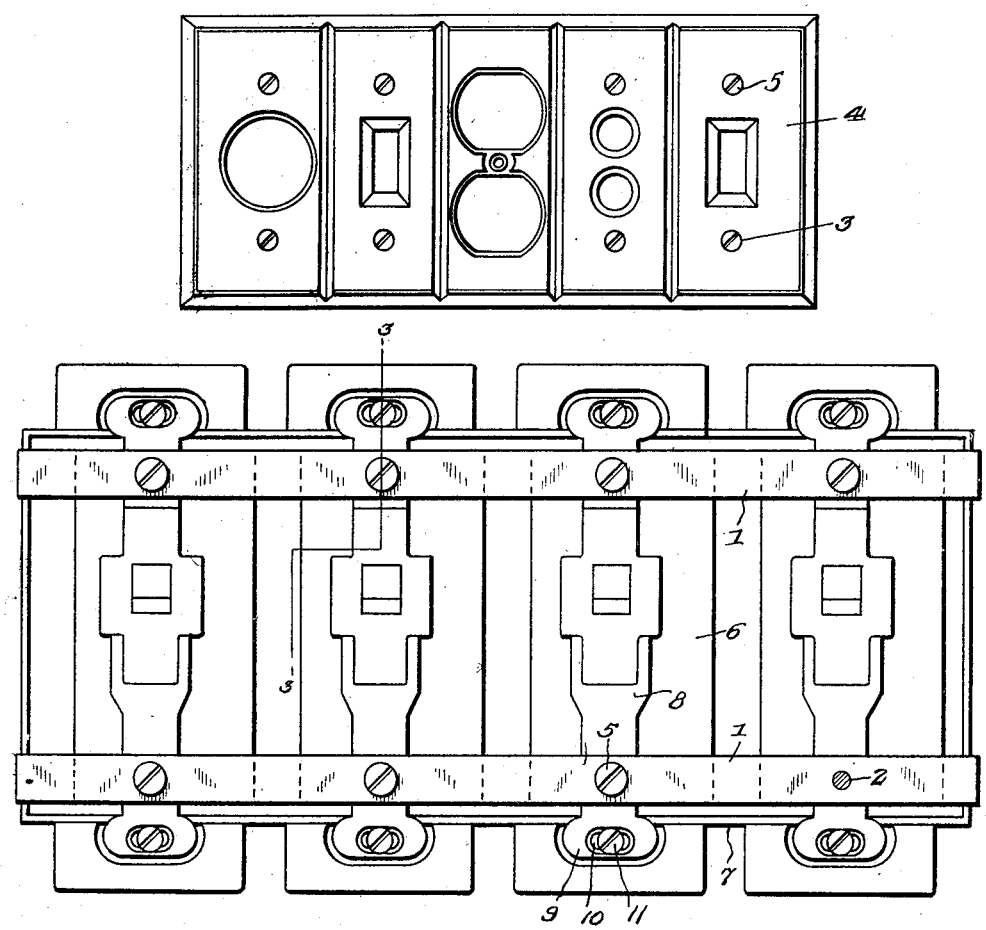
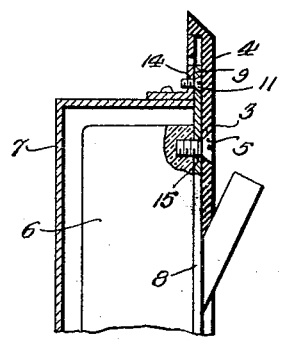
INVENTOR.
R. H. Cunningham,
BY
ATTORNEY.

Patented Mar. 10, 1931

1,795,363

UNITED STATES PATENT OFFICE

ROY HERBERT CUNNINGHAM, OF JACKSON, MICHIGAN, ASSIGNOR TO REYNOLDS SPRING COMPANY, OF JACKSON, MICHIGAN

METHOD OF ASSEMBLING ELECTRICAL DEVICES AND COVER PLATES WITH MULTIPLE-JUNCTION BOXES

Application filed February 14, 1928. Serial No. 254,189.

The invention relates to a method of assembling push button switches, toggle switches, pin type receptacles, pilot lights, Edison base sockets and similar electrical devices and cover plates with multiple junction boxes.

Heretofore, considerable difficulty has been experienced and a large amount of time expended in assembling switches and other electrical devices in multiple junction boxes so that the cover plate or plates could be placed in position and fastened on, and at the same time have the openings in the cover plate or plates arranged so as to permit the switch levers, push buttons or other operating means to work smoothly and not bind on the edges of the slots or openings in the cover plate and the openings in pin type receptacles and Edison sockets properly aligned with the openings in the cover plate.

The object of the present invention is to save time in assembling electrical devices and cover plates with multiple junction boxes and enable workmen to clamp the supporting bars or yokes of the said electrical devices to the junction box with precision and with the parts in full view so that when the cover plate is fastened in position, it will be accurately placed with its slots and openings arranged to permit free movement of the operating means of the electrical devices and with the openings in the cover plate in proper register with the openings in the pin type receptacles, Edison base sockets, and the like.

In the drawings in which like numerals of reference designate the corresponding parts in the several figures:

Figure 1 is an elevation of a multiple junction box, the cover plates being in position.

Fig. 2 is a similar view, the cover plates being removed and the temporary mounting bars being shown supporting the electrical devices.

Fig. 3 is a sectional view taken substantially on the line 3—3 of Fig. 2.

In carrying out the present method, two parallel temporary mounting bars 1—1 are employed. These bars are provided at intervals with openings 2 spaced apart the proper distance to correspond with the screw openings 3 of cover plates 4 and the said openings 2 are adapted to receive screws 5 for securing electrical devices 6 temporarily to the mounting bars while the electrical devices are being permanently or rigidly secured to a multiple junction box 7. The electrical devices may consist of push button switches, toggle switches or other type of switches employed in junction boxes or the said electrical devices may consist of pin type receptacles, a pilot light or an Edison base socket or the like, and these electrical devices are equipped in the usual manner with a supporting bar or yoke 8 extending across the multiple junction box and provided at their ends with heads or enlargements 9 having slots 10 for the reception of clamping screws 11 or other suitable fastening devices for permanently or rigidly securing the yokes or supporting bars to the junction box. The slots 10 are disposed transversely of the terminal portions of the supporting bars or yokes and they permit lateral adjustment of the same and the electrical devices carried by the supporting bars. The supporting bars are provided intermediate of their ends with the threaded openings 2 for the reception of screws 5 for securing the electrical devices to the temporary mounting bars and for securing the cover plates 4 to the supporting bars when the latter are fastened on the multiple junction box.

In assembling the electrical devices and the cover plates, the electrical devices are first placed in the multiple junction box and each switch or other electrical device is electrically connected in its proper circuit. The screws 11 are then placed in position in the slots of the supporting bars and in the threaded openings 14 provided in the junction boxes for the reception of the screws 11. The screws 11 are left sufficiently loose to permit ready adjustment of the electrical devices and the supporting bars. While the electrical devices are thus loosely installed they are aligned in proper position by securing each electrical device to the pair of temporary mounting bars by means of the screws which are passed through the openings 2 in the mounting bars and engaged with threaded openings 15 provided in the supporting bars or yokes for the screws for securing the cover plates to the said bars or yokes. When the electrical devices are temporarily secured to both of the mounting bars 1, the screws or other fastening devices for permanently securing the supporting bars or yokes to the junction box are tightened and the electrical devices are thereby rigidly and permanently fastened and installed in the multiple junction box. It will be seen that as the openings 2 in the temporary mounting bars are spaced apart to correspond exactly with the openings 3 in the cover plates that the latter may now be secured in position and that the slots or openings in the cover plates for the operating means of the electrical devices will be in proper position to permit free movement of such operating means without binding against the edges of the cover plates at the said slots or openings. The temporary mounting bars are then removed for taking out the screws 5 and the cover plates are then secured to the supporting bars or yokes by the screws 5 or other screws provided for that purpose. The cover plate may consist of a single plate or gang plate or a plurality of separate cover plates fitted together may, of course, be employed.

In practice each electrical switch, whether it be a toggle switch, push button or pin type receptacle is contained in a small outlet box or mounted on a yoke, the ends of which should be firmly fastened to the edges of the main terminal or multiple junction box. These small terminal boxes or yokes which fit in the main terminal or junction box, each carrying its push button, toggle switch or pin type receptacle, possibly a pilot light, bull's-eye or Edison base socket, must all be aligned up and screwed tight to the main outlet or multiple junction box, and then a two gang or perhaps a ten gang plate constructed in one solid piece must fit over the various pieces or other electrical devices and each lever or push button must work freely and not bind against the edges of the plate at the slots or openings provided for such operating devices. It will be readily seen that the lining up of a group of these small terminal boxes or yokes so that their combined operating buttons and levers will function smoothly through the fixed holes or slots of the cover or gang plate involves a great deal of guessing, trying, and fitting. When the large cover plate is in position over the main terminal or multiple junction box, the workmen cannot see through the plate and the only means heretofore employed in actual electrical wiring is patiently to work out the problem by trying and fitting as best one can. Ofttimes, the moving of one of these separate units a fraction of an inch causes the moving of all the rest and it is the practice of electrical contractors to allow from one hour to four hours' time, depending on the size of the cover plate for a workman to make an installation. The difficulty experienced by workmen is that there is no guide by which they can line up the small units and fasten them firmly to the main receptacle and know definitely that when they are so fastened that the cover plate will fit over the electrical devices and permit push buttons, operating levers and the like to work freely. By the use of the present invention, it has been found by experience that a good workman can install a ten gang plate in a very few minutes as a simple, practical and efficient method is provided which removes all guessing and fitting as has heretofore been necessary to install switches and other electrical devices in multiple junction boxes.

What is claimed is:—

1. A method of assembling electrical devices and cover plates with multiple junction boxes, consisting in loosely installing a plurality of electrical devices in the multiple junction box, connecting the electrical devices to temporary mounting bars having apertures spaced to correspond with the spaced apertures of a cover plate, then permanently fastening the electrical devices to the multiple junction box, and finally substituting the cover plate for the temporary mounting bars.

2. A method of assembling electrical devices and cover plates with multiple junction boxes, consisting in loosely installing a plurality of electrical devices in a multiple junction box, securing to the electrical devices temporary mounting bars having screw openings corresponding with the screw openings in a cover plate so as to properly space the electrical devices with relation to the cover plate, permanently securing the electrical devices to the multiple junction box, removing the temporary mounting bars from the electrical devices, and finally securing the cover plate to the electrical devices at the points of attachment of the mounting bars.

3. A method of assembling electrical devices and cover plates with multiple junction boxes, consisting in spacing a plurality of electrical devices in a multiple junction box, electrically connecting each device to its proper circuit, loosely securing the electrical devices to permit an adjustment of the same with relation to the multiple junction box, connecting to the electrical devices a pair of temporary mounting bars having screw openings spaced correspondingly with the screw openings in the cover plate, permanently fastening the electrical devices to the multiple junction box, removing the temporary mounting bars and securing the cover plate to the electrical devices at the points of attachment of the temporary mounting bars.

4. A method of assembling electrical devices and cover plates with multiple junction boxes, consisting in temporarily installing a plurality of electrical devices in a multiple junction box by a loose connection, permitting an adjustment of the said devices, adjusting and connecting the electrical devices to temporary mounting bars having screw openings spaced correspondingly with the screw openings in the cover plate, permanently fastening the electrical devices to the multiple junction box, removing the temporary mounting bars and securing the cover plate to the electrical devices at the points where the temporary mounting bars are connected to the electrical devices.

5. A method of assembling electrical devices and cover plates with multiple junction boxes, consisting of installing a plurality of electrical devices with mounting bars having apertures spaced to correspond with the spaced apertures of a cover plate, then permanently fastening the electrical devices to the junction box, and finally placing and securing the cover plate in place.

6. The method of assembling electrical devices in multiple battery boxes, consisting of attaching a mounting bar to the electrical devices to hold them in alignment with the plate openings of a cover plate of a junction box, and while so held fastening said electrical devices to the junction box, after which securing the cover plate in place.

7. The method of mounting electrical devices in a multiple junction box, consisting of aligning said devices with the openings of the cover plate of the junction box by the use of mounting bars which are secured to the electrical devices before said electrical devices are fixed permanently in position, after which securing the cover plates in place at the junction box.

8. The method of assembling electrical devices and cover plates with multiple junction boxes, consisting of loosely mounting electrical devices in the multiple junction boxes, applying a mounting bar to the electrical devices to align them with openings in the cover plate of the junction boxes, securing the electrical devices to the junction boxes, removing the mounting bar, and securing the cover plate in place.

In testimony whereof I have hereunto set my hand.

ROY HERBERT CUNNINGHAM.